United States Patent [19]
Kennedy

[11] 3,965,037
[45] June 22, 1976

[54] METHOD FOR REACTIVATING CARBON

[76] Inventor: Sterling R. Kennedy, 3460 Hollenberg Drive, Bridgeton, Mo. 63044

[22] Filed: Sept. 25, 1974

[21] Appl. No.: 509,353

[52] U.S. Cl............................ 252/415; 210/32; 210/40; 252/412
[51] Int. Cl.$^2$................ B01J 21/20; B01D 15/06
[58] Field of Search................ 252/415, 413, 412; 210/30, 39, 40, 32

[56] References Cited
UNITED STATES PATENTS

| | | | |
|---|---|---|---|
| 1,533,031 | 4/1925 | Saver et al. | 252/413 |
| 3,082,059 | 3/1963 | Goren | 252/412 |
| 3,510,265 | 5/1970 | Kawahata | 210/32 |
| 3,619,420 | 11/1971 | Kemmer | 210/40 |
| 3,730,885 | 5/1973 | Makrides et al. | 210/30 |

FOREIGN PATENTS OR APPLICATIONS

| | | | |
|---|---|---|---|
| 1,005 | 4/1866 | United Kingdom | 252/413 |
| 166,229 | 7/1921 | United Kingdom | 252/413 |

*Primary Examiner*—Winston A. Douglas
*Assistant Examiner*—P. E. Konopka
*Attorney, Agent, or Firm*—John D. Pope, III

[57] ABSTRACT

A method for reactivating carbon beds is provided which is applicable to carbon beds used in filtering water recovered from sewage. The method involves first adding hydrochloric acid to the bed containing some of the water. The water and hydrochloric acid are thoroughly mixed to distribute the acid throughout the carbon bed. The mixture of acid and water is retained in the carbon bed for sufficient time to reactivate the carbon. Thereafter the acid and water are removed from the carbon bed.

10 Claims, 1 Drawing Figure

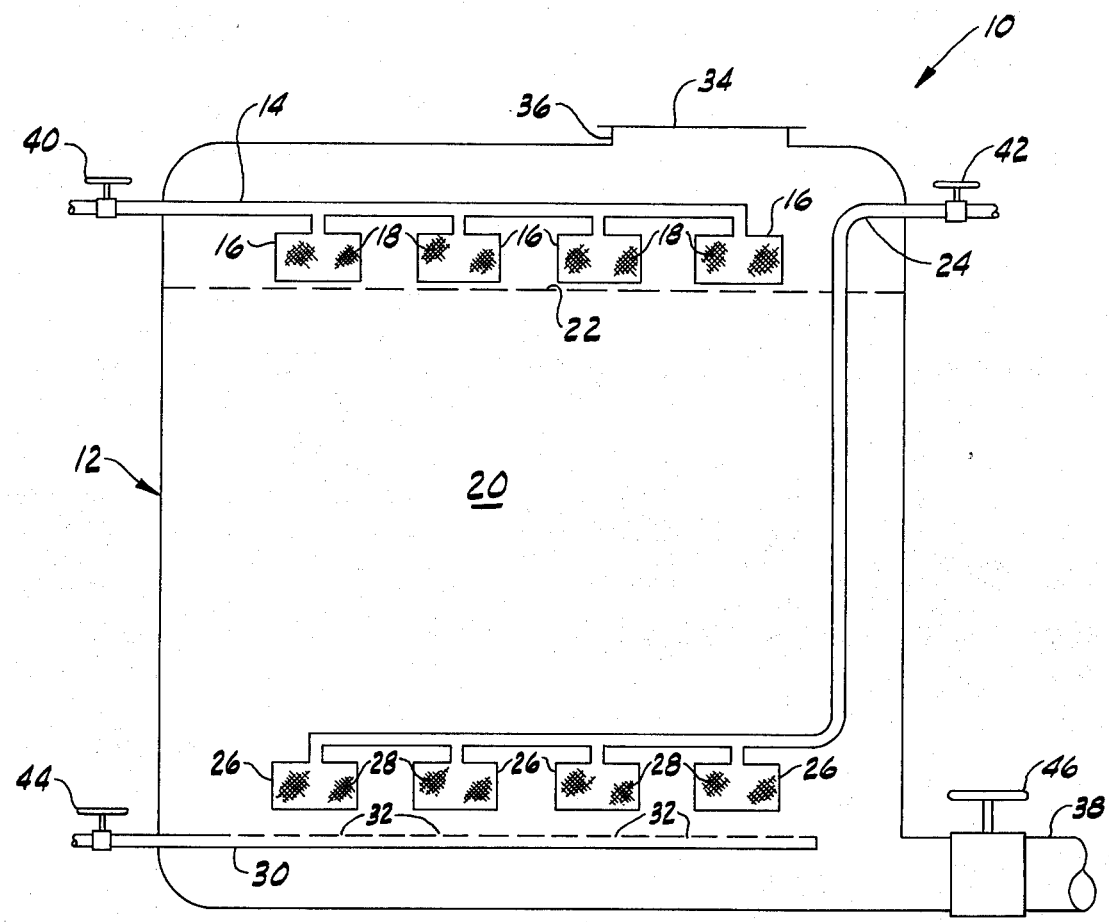

METHOD FOR REACTIVATING CARBON

This invention relates to methods of purifying water reclaimed from sewage and more particularly to a process for reactivating carbon beds that have been exhausted by components in water during such reclamation.

When water is reclaimed from sewage it is often desirable in the final stages of purification to pass the water through one or more filtering agents before the water is again made available for use. These filtering agents remove residual sewage components and any other particulate matter that might be found in the water. The filtering agents thus further purify the water.

One filtering agent frequently used in purifying water reclaimed from sewage is carbon. However, the carbon in a carbon filter bed becomes increasingly ineffective as a filter due to buildup of entrapped sewage components and other particulate matter filtered from the water. The carbon bed thus becomes exhausted and must eventually be replaced or reactivated by removing the entrapped contaminating sewage components from the carbon.

One previously used method for reactivating carbon beds involves roasting the carbon. This method usually requires removal of the carbon from the bed to an incinerator or furnace, and thereafter to a quenching tank, followed by return of the carbon to its filtering location. Such handling, transportation, heating and quenching of the carbon is a costly and burdensome procedure. Moreover, this method usually provides only an 87-91% carbon reactivation with carbon losses in the range of 5 to 10%.

It is thus desirable to provide an inexpensive process for effectively reactivating carbon, which process does not require heating, handling, or removal of the carbon from its filtering location, yet provides efficient carbon reactivation with negligible carbon losses.

Among the several objects of the present invention may be noted the provision of a novel method for reactivating carbon that has been exhausted by use to purify water reclaimed from sewage; a novel method for reactivating carbon that does not require heating of the carbon; a novel method for reactivating a carbon bed that does not require removal, handling or transportation of the carbon from its filtering location; a novel method for reactivating a carbon bed at its filtering location; and a novel method for reactivating carbon by use of chemicals. Other objects and features will be in part apparent and in part pointed out hereinafter.

The invention accordingly comprises the methods hereinafter described, the scope of the invention being indicated in the following claims.

The present invention relates to a method for reactivating carbon beds used in purifying water reclaimed from sewage. In accordance with this method hydrochloric acid is added to a carbon bed containing part of the water reclaimed from sewage. The hydrochloric acid and the water are thoroughly mixed to distribute the acid throughout the carbon bed. The mixture of acid and water are retained in intimate admixture with the carbon for sufficient time to reactivate the carbon. After the necessary time has elapsed the acid and water are removed from the carbon bed which is then ready for further use as a filter. The removed acid is neutralized and discarded.

The accompanying drawing is a simplified schematic representation of a filtering apparatus wherein the process of the present invention can be advantageously carried out.

Corresponding reference characters indicate corresponding parts throughout the drawing.

Referring now to the drawing, a filtering apparatus 10 comprises any suitable known tank 12. Unless otherwise specified, the components of apparatus 10 are formed of any suitable known acid resistant matter such as stainless steel, fiber glass or the like. Tank 12 includes an inlet pipe 14 that communicates with a series of filling screen members 16. Filling screen members 16 include a screen 18 having a mesh that is small enough to prevent a carbon bed 20, which is contained inside tank 12, from passing through screen 18 into inlet pipe 14. The level of carbon bed 20 in tank 12 is indicated by reference number 22.

Tank 12 further includes an outlet pipe 24 communicating with a series of drum screen members 26 submerged in carbon bed 20. Drum screen members 26 include a screen 28 having a mesh small enough to prevent the carbon in bed 20 from passing through and into outlet pipe 24.

Tank 12 also includes an air feeder pipe 30 submerged in carbon bed 20. The portion of air feeder pipe 30 enclosed by tank 12 includes perforations 32.

Tank 12 further includes a removable cover member 34 covering a tank opening 36. Tank 12 also includes a drain pipe 38 having means for preventing loss of carbon from bed 20 therein. Pipes 14, 24, 30 and 38 are respectively provided with shutoff valves 40, 42, 44 and 46.

In using apparatus 10, valves 44 and 46 are closed, valves 40 and 42 are opened and water reclaimed from sewage (not shown) is passed into inlet pipe 14. The incoming water is distributed in tank 12 through screens 18 of screen members 16 for discharge over carbon bed 20. The water flows through carbon bed 20 and then passes through screens 28 of drum screen members 26, flowing into outlet pipe 24. Carbon bed 20 thus filters the water during its flow from inlet pipe 14 to outlet pipe 24 of tank 12.

Although carbon bed 20 can be scheduled for reactivation at predetermined time intervals or after a predetermined amount of water has passed through apparatus 10, other suitable scheduling arrangements can be devised.

To reactivate carbon bed 20, valves 40 and 42 are closed, and valve 46 is opened to permit drainage of water from tank 12. When the water level in tank 12 has drained down to a height of approximately one inch above level 22 of carbon bed 20, valve 46 is closed preventing further drainage of water from tank 12.

Cover member 34 is removed from tank opening 36 and hydrochloric acid (16°Be., manufacturer's grade) is pumped or dumped into tank 12 through tank opening 36. The amount of acid added to tank 12 is approximately 10% of the undrained water remaining in tank 12. The retained water and acid are then thoroughly mixed to distribute the acid throughout carbon bed 20. This mixing is accomplished by opening valve 44 to permit high pressure air to enter tank 12 through pipe perforations 32. The high pressure air in addition to mixing the acid with the carbon also minimizes the formation of hydrogen sulfide in tank 12.

A thorough mixing of the acid and water is accomplished by introducing pressurized air through perforations 32 into tank 12 in about three to five second bursts approximately every three minutes for twenty-four hours. Thorough mixing also will occur when prolonged high pressure air bursts are introduced into tank 12 at approximate half hour intervals for at least 16 hours and then at least twice during a subsequently 8 hour interval. When the acid and water have been thoroughly mixed with the carbon as described, there is 95–97% carbon reactivation with losses of carbon measuring less than 1%.

After a 24 hour reactivation period the acid and water mixture is drained from tank 12 through drain pipe 38, neutralized and discarded. Apparatus 10 is then again ready for use as a filter and valves 44 and 46 are closed and valves 40 and 42 are opened to permit flow of freshly added water reclaimed from sewage through carbon bed 20.

In the event that appreciable amounts of hydrogen sulfide are found in tank 12 after acid reactivation, the freshly added water released into tank 12 through pipe 14 is drained through pipe 38 until the water level has receded to a height of approximately one inch above carbon level 22. A caustic alkali such as sodium hydroxide (50%, manufacturer's grade) is then added to tank 12 through opening 36 in an amount approximately equivalent to 10% of the water remaining in tank 12. The sodium hydroxide and water are retained in contact with the carbon for about 6 to 24 hours depending upon the severity of the hydrogen sulfide which has developed in tank 12. During this period of retention the water and sodium hydroxide are thoroughly mixed for distribution throughout carbon bed 20. This mixing is accomplished by introducing high pressure air into tank 12 in the same manner previously described for the acid reactivation of carbon bed 20. Tank 12 is thereafter thoroughly drained through pipe 38 and the drained liquid is neutralized before being discarded.

Some advantages of the present invention evident from the foregoing description include a method for reactivating carbon beds that does not require the carbon bed to be handled, transported, heated or quenched since the carbon is reactivated without being removed from a filter tank. Thus there is no need for an incinerator, furnace or quenching tank.

In view of the above, it will be seen that the several objects of the invention are achieved and other advantageous results attained.

As various changes could be made in the above methods without departing from the scope of the invention, it is intended that all matter contained in the above description or shown in the accompanying drawing shall be interpreted as illustrative and not in a limiting sense.

What is claimed is:

1. The method of reactivating in place carbon in a carbon bed which has been used in filtering water reclaimed from sewage and is contaminated with sewage components which consists in removing from the carbon excess water but discontinuing such removal before the water level reaches the level of the bed, adding hydrochloric acid to said carbon, mixing the water remaining with the hydrochloric acid by blowing pressurized air into said mixture to thoroughly mix the acid with the carbon and to minimize the formation of hydrogen sulfide, periodically repeating said mixing while retaining the mixture of acid and water with the carbon for sufficient time to reactivate the carbon, and then removing the acid and water from the carbon.

2. The method of claim 1 wherein said pressurized air is high pressure air periodically blown into the acid and water.

3. The method of claim 1 wherein the amount of acid added to the carbon and water is approximately 10% of the water remaining with the carbon after the excess has been removed.

4. The method of claim 1 wherein the acid and water are retained in contact with the carbon for about 24 hours before said acid and water are removed from the carbon.

5. The method of claim 4 wherein the acid, water and carbon are mixed approximately every thirty minutes for at least sixteen hours and then at least twice during the next eight hours.

6. The method of claim 1 wherein the acid and water are mixed for about three to five seconds approximately every three minutes during the time that the acid and water are retained with the carbon.

7. The method of claim 1 wherein fresh water reclaimed from sewage is added to the carbon after the mixture of acid and water have been removed, and subsequently a caustic alkali is added to the carbon and freshly added water, said method further including mixing the caustic alkali and freshly added water reclaimed from sewage thoroughly with the carbon, retaining the mixture of caustic alkali and water in contact with the carbon for sufficient time to react with hydrogen sulfide in the carbon and then removing the freshly added water and caustic alkali from the carbon.

8. The method of claim 7 wherein the caustic alkali, the freshly added water and the carbon are retained together for approximately 6 to 24 hours.

9. The method of claim 7 wherein the amount of caustic alkali added to the freshly added water is approximately 10% of the freshly added water.

10. The method of claim 7 in which the caustic alkali is sodium hydroxide.

* * * * *